July 28, 1970  O. I. ROSSI  3,521,770
METHOD FOR FORMING A BUNDLE OF SOWN OR PLANED
BOARDS OR PLANKS, SORTED AS TO LENGTH
Filed Aug. 27, 1968  4 Sheets-Sheet 1

ONNI I. ROSSI
INVENTOR.

BY Albert M. Parker
ATTORNEY.

July 28, 1970     O. I. ROSSI     3,521,770
METHOD FOR FORMING A BUNDLE OF SOWN OR PLANED
BOARDS OR PLANKS, SORTED AS TO LENGTH
Filed Aug. 27, 1968     4 Sheets-Sheet 2

ONNI I. ROSSI
INVENTOR
BY Albert M. Parker
ATTORNEY

July 28, 1970  O. I. ROSSI  3,521,770
METHOD FOR FORMING A BUNDLE OF SOWN OR PLANED
BOARDS OR PLANKS, SORTED AS TO LENGTH
Filed Aug. 27, 1968                                          4 Sheets-Sheet 4

ONNI I. ROSSI
INVENTOR

BY Albert M. Parker
ATTORNEY.

United States Patent Office 3,521,770
Patented July 28, 1970

3,521,770
METHOD FOR FORMING A BUNDLE OF SAWN OR PLANED BOARDS OR PLANKS, SORTED AS TO LENGTH
Onni I. Rossi, Kaskinen, Finland, assignor to Oy. Tahka AB., Kaskinen, Finland, a corporation of Finland
Filed Aug. 27, 1968, Ser. No. 755,626
Claims priority, application Finland, Sept. 5, 1967, 2,384/67
Int. Cl. B65g 57/22
U.S. Cl. 214—152          5 Claims

ABSTRACT OF THE DISCLOSURE

A method for forming a bundle of sawn or planed boards or planks, sorted as to length and conveyed in their tranversal direction to be dropped from the transverse conveyor to constitute a pile providing a portion of the height of the finished bundle and having the width of one board or plank, this pile is thereafter pushed sideways and another pile is thereafter formed at the evacuated site, this second pile is similarly pushed sideways together with the first formed pile, and this is continued until the piles situated adjacent each other constitute a partial bundle having the width of a complete bundle. The partial bundle is thereafter transferred vertically so as to permit the formation of the next partial bundle, which thereafter is similarly transferred vertically along with the previous partial bundle and this is continued until the bundle reaches its desired height, whereafter the thus formed bundle is transferred to the next following handling step for example, a tying step.

BACKGROUND OF THE INVENTION

Field of invention

This invention relates to a method for forming a bundle of sawn or planed boards or planks, sorted as to their length and conveyed in their transversal direction one at a time into a bundle forming apparatus. The object of the invention is to provide a method which permits forming, of boards or planks which have been sorted to their length, bundles meeting contemporary requirements, in a reliable manner well adapted to the purpose and requiring a minimum of manual labor. The method of the invention is applicable for use in connection with length sorting, there being provided either a separate bundle forming step for each length dimension or a common bundle forming step for all dimensions, in which case, however, each dimension is formed into separate bundles according to the requirements of modern transport methods and techniques.

Description of the prior art

There exists bundling apparatus in the prior art, an example of which is disclosed in Swedish Pat. No. 200,-575, titled "Anordning för bildande av en stapel av bräder" (Apparatus for Forming a Bundle of Boards).

The apparatus of said Swedish patent forms the bundle by first piling the boards to form a pile of one board width, the height of which is equal to that of the finished bundle, and by thereafter pushing said high pile laterally to await completion of the following piles, each of which then pushes the earlier completed piles further laterally. Thus the bundle is composed of several board piles of bundle height. Considering that at present the most common bundle dimensions, in terms of width by height, vary between 20" by 20" and 48" by 48", it is obvious that keeping piles of such height upright presents considerable difficulties particularly when handling narrow boards.

A drawback of the method manifests itself also when handling deficient bundles. When the quality of the timber to be sorted changes, the boards remaining in each length compartment must be removed either to storage or to a binding station, while the deficient bundles or, more accurately put, the bundles deficient as to their width, must be re-piled to form bundles of full width but of deficient height. The storage of such bundles and their subsequent combination to form full bundles is easy. Bundles of e.g. half height are even accepted for export shipping.

As another considerable disadvantage which must be considered is the fact that the insertion of intermediate (binding) slabs in the bundle, particularly important for the cohesion of narrow board bundles, is quite impossible in the describer bundling step.

SUMMARY OF THE INVENTION

The method of the present invention eliminates the above-mentioned disadvantages, the principal characteristics of said method being that a pile providing a portion of the height of the finished bundle and having the width of one board or plank is first formed of the boards or planks, this pile is thereafter pushed to the side and another pile is thereafter formed at the evacuated site, the second pile is similarly pushed to the side adjacent the first pile so as to make room for formation of another pile, and this is continued until the piles situated adjacent each other constitute a partial bundle having the width of a completed bundle, said partial bundle is thereafter transferred vertically so as to permit the formation of the next partial bundle, which thereafter is similarly transferred vertically along with the previous partial bundle in the same direction, to contact the previous partial bundle, and this is continued until the bundle reaches its desired height, whereafter the thus formed bundle is transferred to the next following handling step such as to be tied.

The use of the bundle forming method of the present invention permits, during bundle formation, the insertion of the transverse intermediate slabs, often required between a few board or plank layers for the purpose of maintaining the shape of the completed, bound bundle. Such insertion of intermediate slabs has heretofore been carried out at the bundle binding station and has involved the provision of a suitable gap between the desired board or plank layers in an otherwise completed bundle, for insertion of the intermediate slabs. This obviously complicates and slows down the binding of the bundle.

Dropping of the boards or planks from a transverse conveyor to the pile can be effected in various ways, but a particularly suitable method and apparatus for this purpose is disclosed in my pending U.S. application No. 641,043 which has the same assignee as this application. The term "boards" as used throughout this specification and in the appended claims comprehends sawn or planed boards, planks and other elongated lumber.

BRIEF DESCRIPTION OF THE DRAWING

The method of the invention is described more particularly in the following with reference to the accompanying drawings illustrating some embodiments of suitable apparatus for carrying out the bundle forming method according to the invention. In the drawings.

DESCRIPTION OF THE PREFERRED EMBODIMENTS

Figure 1:
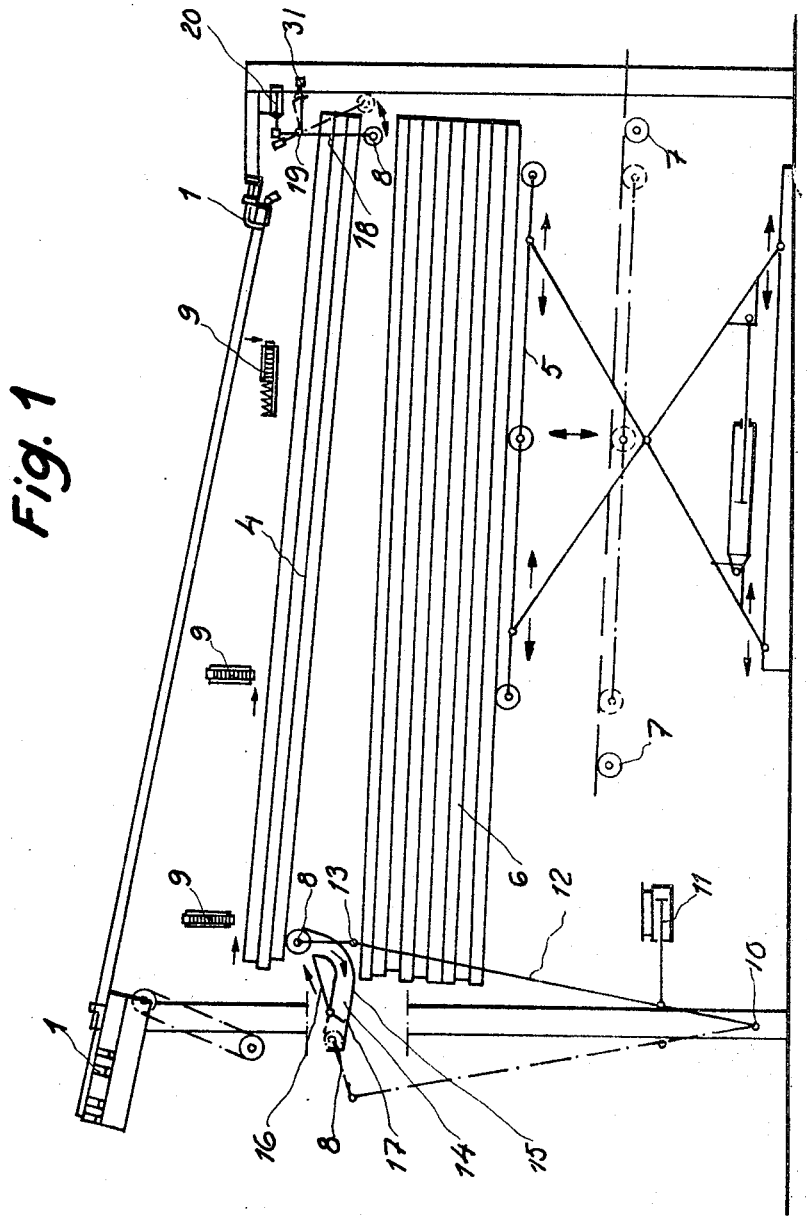
FIG. 1 shows, in side elevation and in section along the line I—I of FIG. 2, an apparatus for use in carrying out the method of the invention.

The illustrated apparatus for bundle forming is located in connection with a length sorting plant, but it can alternatively be located separately, in which case, for bundling different length dimensions, at least one end of the apparatus must be supported e.g. on a movable wagon.

The operational principle of the illustrated apparatus is as follows:

A conveyor 1 brings boards of the same length, in a transversal direction, to the bundling apparatus and piles a preprogrammed number of them on top of each other to form a pile 2, whereafter a pushing device 3 situated laterally of pile 2 pushes the pile so as to form a partial bundle 4.

This is repeated, the new pile pushing the piles in partial bundle 4 in front of it, and when the piles in partial bundle 4 reach a desired number, the partial bundle is lowered to an underlying bundle support 5 which correspondingly is lowered a distance equalling the height of the pile, thus making room for the formation of the next partial bundle 4. When the number of boards in bundle 6 reaches a desired value, the bundle support 5 descends to its lowest position, delivering the bundle onto an underlying conveyor 7 to be transferred from its support 5 in a desired direction, whereupon the support 5 rises to its upper position to receive subsequent partial bundles 4.

PERFORMANCE OF THE METHOD

Dropping of the boards onto pile 2, after conveying them to the dropping station in a transverse direction, can be carried out in various manners, such as that disclosed in the aforementioned pending U.S. patent application No. 641,043.

Ordered formation of pile 2 presupposes generally that the dropping or sliding distance of the boards is short, which is taken care of by lowering the support 29 of the pile 2 in dependence of the number of accumulated boards, or, with a stationary support, by making the pile low enough, the number of boards in the pile varying in dependence of the board thickness, e.g. from in a pill 2 to 10. Herein only the last mentioned or stationary alternative is discussed, it being simpler of construction.

The pushing of the pile into the partial bundle 4 can be effected e.g. by means of hydraulic rams 3 having a constant stroke length corresponding to the maximum board width.

In the partial bundle 4 the piles are supported preferably by two supports 8 (FIGS. 1, 2 and 3), located as near the board ends as possible.

The better the control of the transfer of the partial bundle 4 into the bundle 6, the better formed and denser the bundle 6 will be. The dropping distance to bundle 6 must correspond to the maximum deflection. Particularly with shorter boards the deflection is so small that the boards in partial bundle 4 can be freely dropped into bundle 6, especially if one end of the board is dropped first and the other subsequently. When handling long boards or boards deformed during drying, it is, however, necessary to use so substantial a dropping height that the above mentioned free dropping results in a bundle 6 of low density and somewhat deformed shape. This disadvantage can be eliminated by the following alternative methods:

(1) The dropping height is reduced by raising the bundle 6 upward at the stage when the ram 3 is pushing the last pile into the partial bundle 4, whereafter the dropping is carried out and the bundle 6 is lowered to make room for the formation of another partial bundle.

(2) The position of the partial bundle 4 is inclined in the longitudinal direction of the boards to such an extent that the lowest point of the deflection of the boards in partial bundle 4 will not be lower than the lower of the underlying supports 8, whereby the dropping height of the horizontal portion of the partial bundle is very small and the dropping height of the other end is so great that it requires controlled dropping by application either of braking means or mechanical guiding.

(3) A modification of (2):

The partial bundle 4 is horizontal while the bundle 6 is inclined.

(4) Modification of method steps (1) to (3):

Partial bundle 4 and bundle 6 both are horizontal and both ends mechanically guided.

(5) Modification of steps (1) to (4):

Partial bundle 4 is horizontal, the bundle 6, one end leading, comes together, first with one end of the partial bundle 4 and then with the other end:

According to the bundling method being described the bundle is composed of smaller piles 2 which are combined to form partial bundles 4 of the width of a complete bundle but of deficient height, which in the last stage, piled on top of each other, form a complete bundle 6.

In this method, starting on conveyor 1, progressively increasing numbers of boards are handled at points 2, 4 and 6, with the result that the time available for each working step also increases. This results in that the shortest operation time having effect on the capacity of the machine is concentrated solely in point 2, where the lightest units of entire process are handled.

In the practical realization and arrangement of the bundling the so-called deficient bundles or rest lots cause a difficult problem. Each time there is a change in the quantity of the lumber being sorted, rest lots of each length remain in the sorting plant. The rest lots heretofore have usually been formed into bundles of full height but less than full width. According to the method of this invention even the deficient bundles are first completed as to their width, the method thus meeting in this respect the practical requirements.

The intermediate slabs can be inserted between predetermined partial bundles. For this purpose three magazines 9 for intermediate slabs are provided above the partial bundle 4 (see FIGS. 1, 2 and 3). Of the intermediate slab magazines the one located furthest at right in the drawing is situated in a reclining position in order not to be in the way of the boards passing above. By virtue of this arrangement the slabs can, in a manner prior known per se, be dropped in timed sequence on top of the finished partial bundle 4 before it is lowered onto the bundle 6. By means of suitable devices, not shown, the intermediate slabs can also be placed on top of the bundle 6 before the partial bundle 4 is lowered.

The controlled lowering of partial bundle 4 onto bundle 6 can be carried out by various means, some of which are schematically shown as examples in FIGS. 1, 2, 4, 5, of the drawings.

Figure 2:
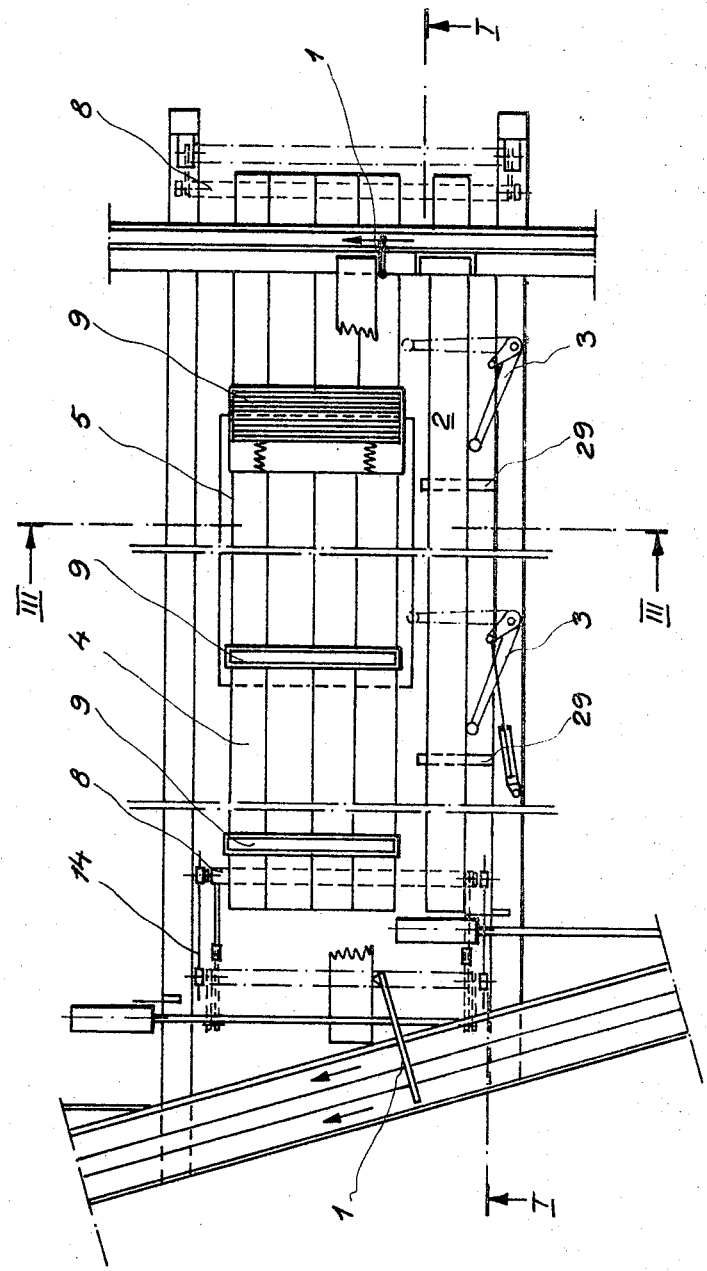
FIG. 2 shows a top view of the apparatus of FIG. 1.
Figure 3:
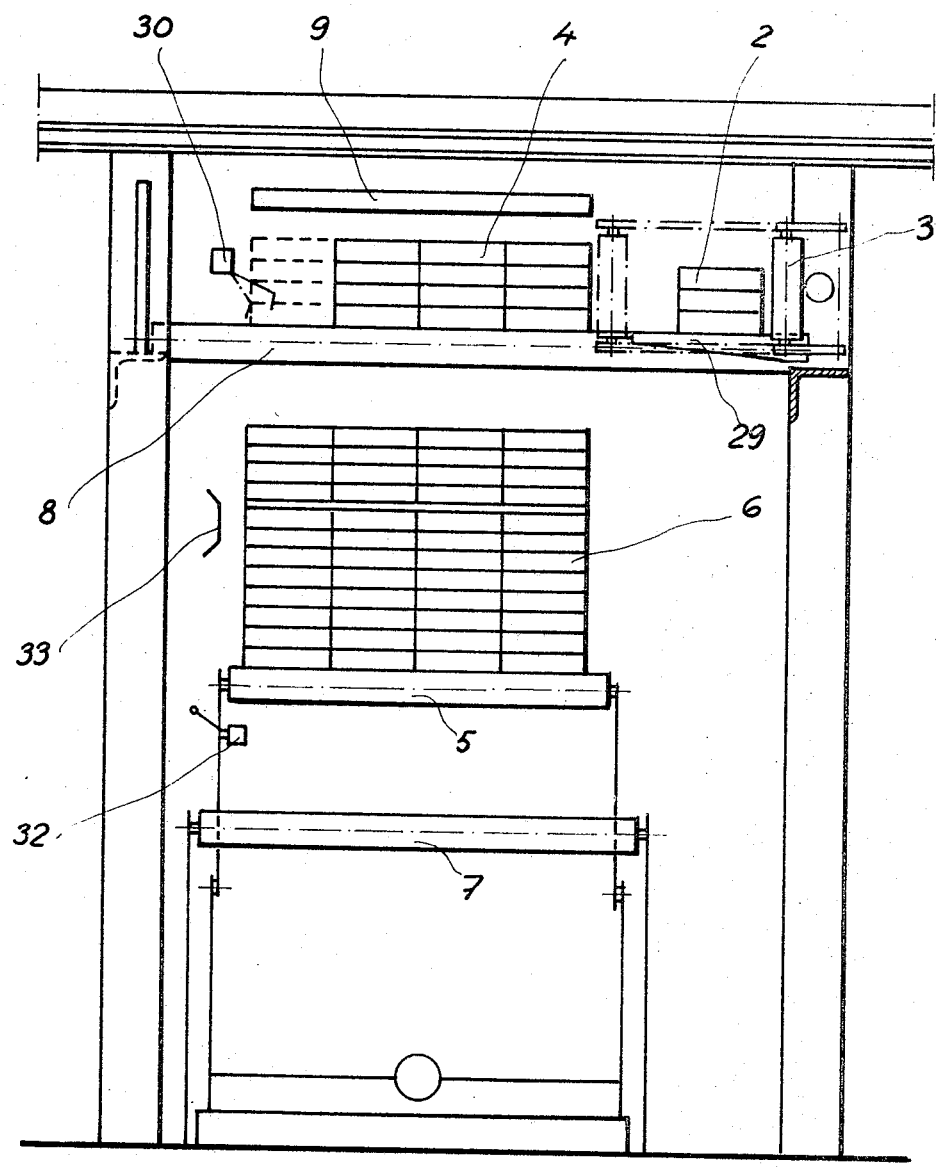
FIG. 3 shows an end view and a section taken along the line III—III of FIG. 2 and looking in the direction of the arrows.

In FIGS. 1 and 2 different guiding means of the support 8 have been shown at different ends of the partial bundle 4. In the following the apparatus shown at left on the drawing is described at first.

The support 8 is at one end supported by a double pivot arm 12 actuated by a cylinder-piston means 11 about a pivot 10. The arm portions of the double pivot arm are connected by pivot 13, which permits the arm portions to be locked in a position where the arm portions form an angle slightly exceeding 180°, whereby the double pivot arm cannot buckle even if there is a load on the support 8. The apparatus includes also a guide 14 for the support end, the guide having a lowering guiding surface 15 and a return guiding surface 16, the latter one having a flap 17. When the partial bundle 4 is finished, the cylinder-piston device 11 pushes the double pivot arm 12 so as to make the pivot 13 buckle, and the support 8 to follow the lowering guiding surface 15 with the partial bundle 4. At a predetermined point of the guiding surface 15 the adjacent end of the partial bundle drops out from the support 8 while the support 8 continues to follow the guiding surface 15 until it pushes the flap 17 out of its way whereafter the flap is free to drop into its original position. Thereafter the cylinder-piston device 11 returns to its original position forcing the support 8 to ascend along the flap 17 and the return guiding surface 16 into its original position where the support 8 is ready to receive piles 2 to form another partial bundle 4.

At the right-hand end of FIGS. 1 and 2 another apparatus for guiding the support 8 is shown. This apparatus has a two-armed lever 18 secured at its lower end to each end of the support 8, and a pushing device 20 engaging the end of a lever 18 situated above a turning pivot 19. The pushing device 20, when receiving an impulse, pushes the upper end of the lever 18 so that the support 8 situated at the lower end of the lever 18 slides from under the partial bundle 8 which thus freely falls onto the bundle 6. The support 8 is returned to its original position by gravity at the moment the pushing member 20 has returned to its original position.

Figure 4:
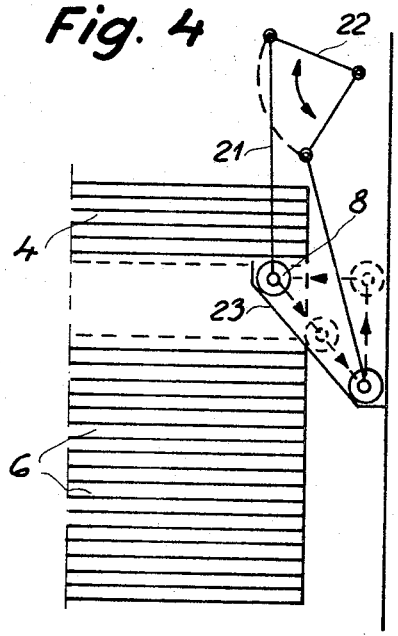
FIGS. 4, 5 and 6 schematically illustrate various guiding devices by means of which the partial bundles are lowered down.

In the apparatus according to FIG. 4 the support 8 is suspended by an arm 21 from the free end of a forcibly driven lever 22. When the partial bundle 4 is completed, the lever 22 is turned down, whereby the support 8 progressively slides from under the partial bundle 4 along the surface of a guide plate 23. The support 8 is returned to its original position by turning the lever 22 up.

Figure 5:
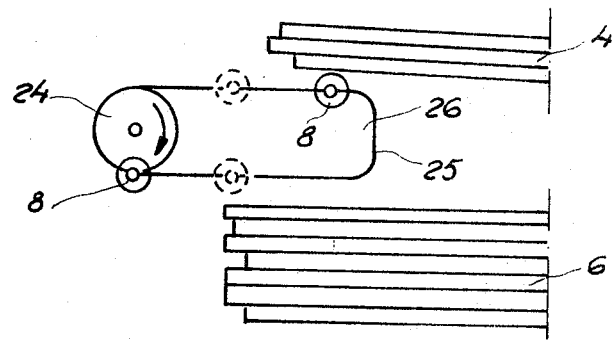

In FIG. 5 the supports 8, of which there are two, are secured at their ends to a chain 25 driven by a chain wheel 24, the chain being arranged to travel in the direction indicated by an arrow, along a guiding groove situated e.g. at the edge of a plate 26.

Figure 6:
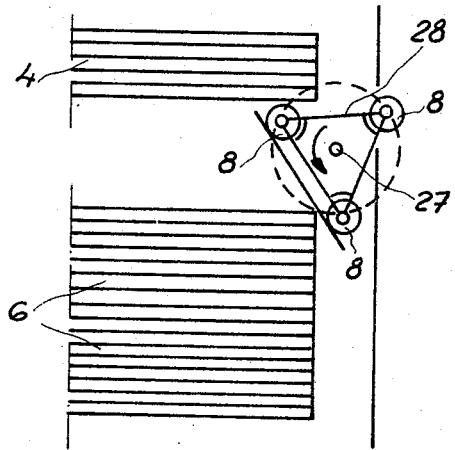

FIG. 6 shows the ends of three supports 8 secured at the points of a plate 28, shaped in the configuration of an equilateral triangle, and rotating about its center 27. The movement takes place in the direction indicated by an arrow, 120° at a time.

It is to be understood that other lowering mechanisms than the above described can be used as well.

Automatic control

As the boards are dropped onto the pile 2, each board gives an impulse to a counting device which after a predetermined count gives an actuating impulse to the pushing device 3.

At the completion of a partial bundle, the leading pile when reaching its final position, starts through a limit switch 30 the lowering devices such as 11 and 20 of the support 8, and also the lowering of the bundle support, which is stopped for instance by a limit switch 31 actuated by the support 8 shown at right in FIG. 1, as it returns by gravity to its original position. After the last partial bundle 4 has started the lowering of the bundle support 5, the lower portion of bundle 6 or a lever secured to the bundle support engages a limit switch provided at a suitable height, said switch being connected to the control circuit in such a manner that the limit switch 31 will not stop the lowering the bundle support 5 but permits it to continue until the bundle 6 is supported on the conveyor 7.

The startup of the dropping or insertion mechanism of the intermediate slabs can also be carried out by means of limit switches e.g. by connecting a limit switch 32 secured to the bundle support 5 and moving vertically along with the bundle support in series with the limit switch 31, and by securing a catch 33 for engagement with the limit switch 32 of the stationary body of the apparatus, the positions of the limit switches 31 and 32 being vertically adjustable so that when the partial bundle 4 has been built up to the desired height, the dropping mechanism of the intermediate slabs will be actuated and the limit switch 31 will be closed, which thereat will simultaneously start the dropping of the intermediate slabs, the lowering devices of the partial bundle supports 8 and the lowering of the bundle support. With continued lowering of the bundle support the limit switch 32 will reach the catch 33, whereby the limit switch is opened and the dropping mechanism of the intermediate slabs will not start up at the next partial bundle.

In case intermediate slabs are desired to be inserted into more than one gap, a corresponding number of start-up catches for the limit switch must be provided.

I claim:
1. Method of forming a bundle of boards which have been pre-sorted according to length and conveyed in a direction transverse to their length, comprising: forming a first pile of boards having the width of one board and a height which is a portion of the height of a completed bundle; pushing said first pile to one side; forming successive piles of boards at the site where the first pile was formed and pushing each successive pile to the side adjacent the preceding pile to make room for the formation of the next succeeding pile until said piles situated adjacent each other constitute a first partial bundle having the width of a completed bundle; vertically transferring said first partial bundle for providing room for the formation of a next partial bundle; forming successive partial bundles in the same manner as the first partial bundle and vertically transferring each partial bundle in the same direction as the preceding partial bundle until superimposed partial bundles reach a desired height constituting a completed bundle; and transferring the completed bundle to another handling station.

2. The method of claim 1 including placing intermediate slabs transversely of the bundle between the partial bundles.

3. The method of claim 1 including forming said piles by dropping one end of each board on to the pile then permitting the other end of the board to drop.

4. The method of claim 1 including at least partially controlling the forming of the completed bundle from partial bundles by dropping one end of each successive partial bundle and then permitting the other end of the partial bundle to drop freely.

5. The method of claim 1 including: at least partially supporting each succeeding partial bundle by raising the preceding partial bundle into supporting engagement with the next succeeding partial bundle when said next succeeding partial bundle has reached the width of a completed bundle; and then lowering the successive bundles for permitting formation of another partial bundle.

References Cited

UNITED STATES PATENTS 2,607,501  8/1952  Jeffrey.
2,958,431  11/1960  Curtenius.
2,985,322  5/1961  Parker.
3,388,815  6/1968  Lingl.

GERALD M. FORLENZA, Primary Examiner

R. J. SPAR, Assistant Examiner

U.S. Cl. X.R.

214—6